No. 836,913. PATENTED NOV. 27, 1906.
H. A. BEEKHUIS.
APPARATUS FOR REMOVING THE SKIN FROM FRUIT.
APPLICATION FILED AUG. 22, 1905.
2 SHEETS—SHEET 2.
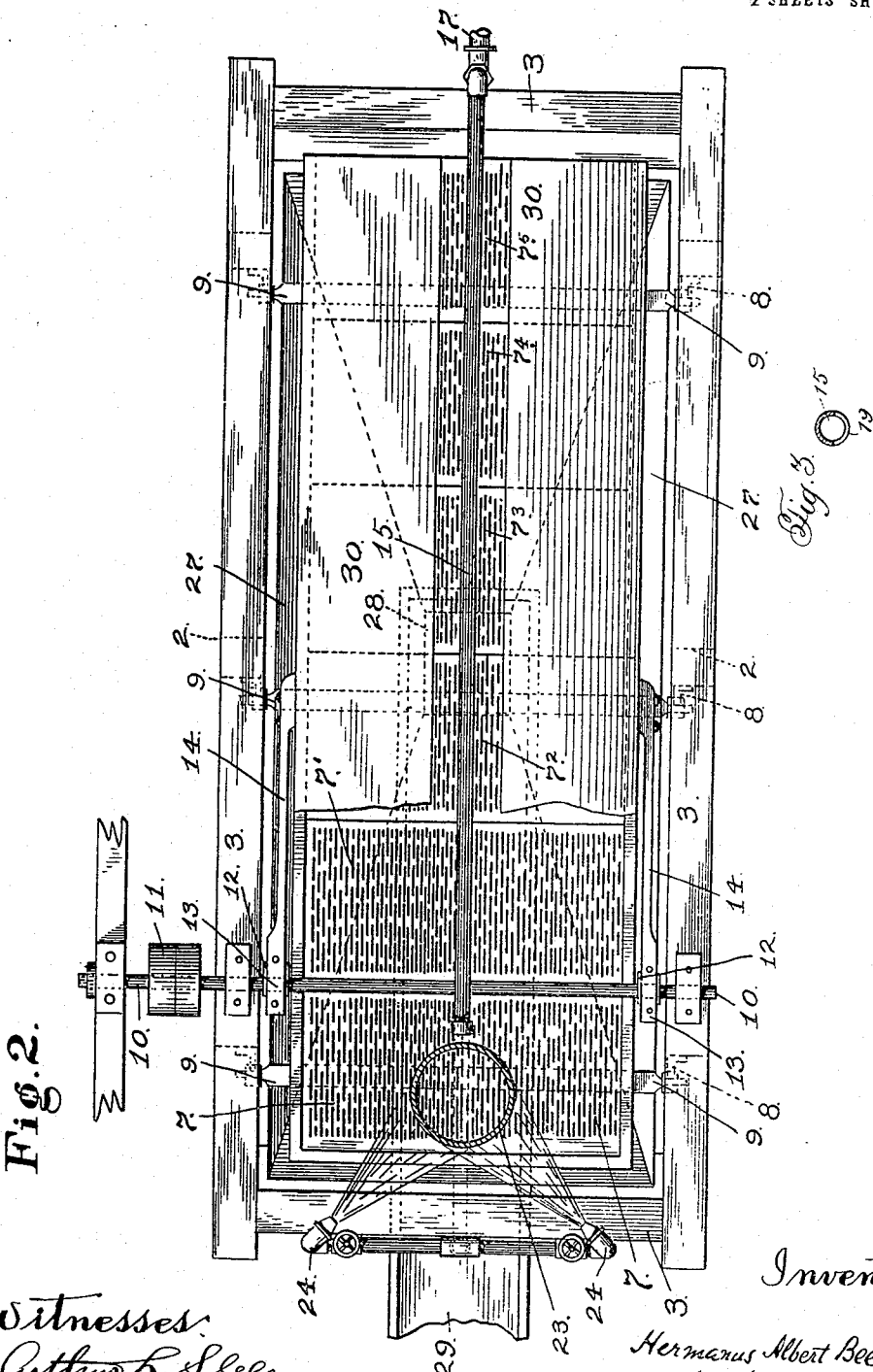

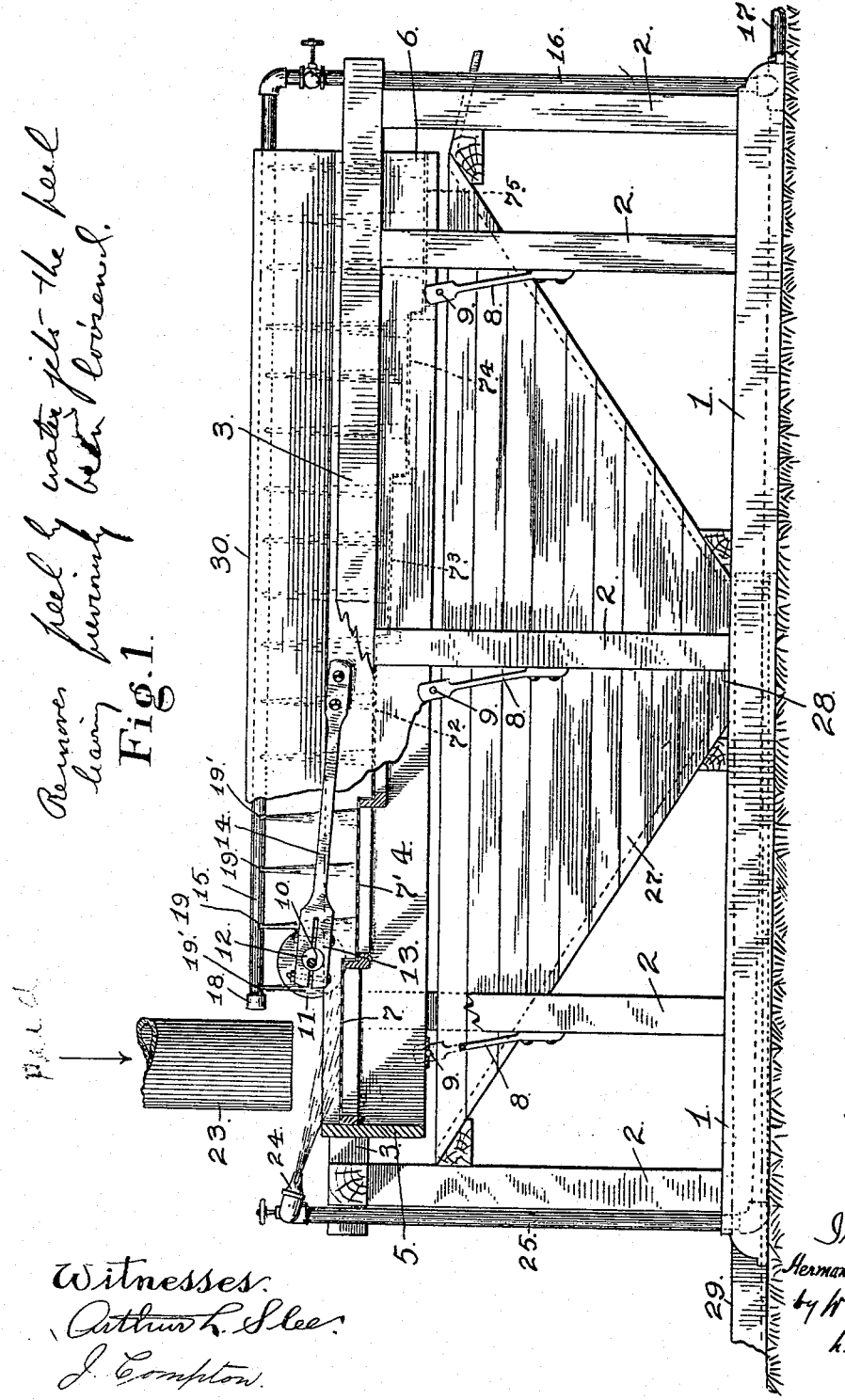

UNITED STATES PATENT OFFICE.

HERMANUS ALBERT BEEKHUIS, OF HANFORD, CALIFORNIA, ASSIGNOR TO CALIFORNIA FRUIT CANNERS ASSOCIATION, OF SAN FRANCISCO, CALIFORNIA, A CORPORATION OF CALIFORNIA.

APPARATUS FOR REMOVING THE SKIN FROM FRUIT.

No. 836,913.      Specification of Letters Patent.      Patented Nov. 27, 1906.

Application filed August 22, 1905. Serial No. 275,251.

*To all whom it may concern:*

Be it known that I, HERMANUS ALBERT BEEKHUIS, a citizen of the United States, residing at Hanford, Kings county, State of California, have invented certain new and useful Improvements in Apparatus for Removing the Skin from Fruit; and I do hereby declare the following to be a full, clear, and exact description of the same.

My invention relates to that class of apparatus for removing the previously-disintegrated skin from fruit in which jets of water are directed upon the fruit while advancing under agitation.

My invention consists in the novel construction of the supporting-screen upon which the fruit is shaken and advanced in connection with an arrangement, with relation thereto, of the means for supplying the water-jets, as I shall hereinafter fully describe.

My present invention is an improvement upon that apparatus forming the subject-matter of my pending application, Serial No. 209,648, filed May 25, 1904, to which reference is hereby made for the purpose of more clearly stating and understanding the object of said present invention.

In my former machine the water-jets were directed upon the fruit from below, as well as from above. The jets from below to be effective required a screen-support for the fruit of as open a character as possible to let the water through with the least obstruction; but such openness is inconsistent with smoothness of screen-surface. When it is considered that the fruit having been previously subjected to solutions for disintegrating its skin is rather tender, it becomes plain that a rough-surfaced screen tends to bruise and damage it. It is best, therefore, to have as smooth a screen-surface as possible, which result may be gained by having said screen less open—that is, one in which the surface is broken by as small apertures as possible. As such a screen renders the water-jets from below impractical and dependence must be placed on the upper jets alone, it becomes necessary to provide other means for turning the fruit during its advancement in order to properly present every portion of the fruit to said jets.

The object of my invention, therefore, is to properly present the passing fruit to the action of peeling-jets of water from above without bruising or damaging said fruit. This object is attained by the novel screen-support and the peeling water-jets relatively arranged in connection therewith, as I shall now describe by reference to the accompanying drawings, in which—

Figure 1 is a side elevation, partly broken, of my apparatus. Fig. 2 is a plan of the same. Fig. 3 is a sectional view showing one of the cross-slits in the pipe 15.

The frame of the apparatus or machine comprises sills 1, suitable uprights 2, and horizontal top pieces 3, supported by the uprights.

4 is a box closed across its feed end 5 and open at its discharge end 6. The bottom of the box is a screen; but instead of being made in one continuous plane it is composed of a plurality of sections in successively lower planes from head to foot. Thus the section 7 at the head or closed end of the box is higher than the succeeding section 7', which itself is higher than the next section $7^2$, the latter being higher than $7^3$, which is higher than $7^4$, which is higher than $7^5$, the last being the final or foot section, as I have for the purpose of illustration shown six sections. Between the end of one section and the beginning of the next section there is, therefore, a drop or fall, as shown in Fig. 1, which drop is in practice about two inches. By referring to Fig. 2 it will be seen that the screen-bottom sections are not of a very open character, being provided with very narrow slits. This, while providing for sufficient drainage, gives a comparatively smooth surface, which is of advantage, as I have stated, in not tending to damage the tender fruit.

The box 4 is carried by spring-arms 8, secured at their upper ends to cross-rods 9, fastened under the box, and at their lower ends fastened to the uprights 2 of the main frame. A shaking motion is imparted to the screen-box 4 by suitable means—such, for example, as by the power-shaft 10, with its pulleys 11, eccentrics 12, boxes 13, and connecting-rods 14, secured to the sides of the box. This mechanism gives the box such a motion that the fruit is agitated, shaken, and danced upon and over the screen-bottom sections, advancing and dropping from one to the other from head to foot. Above the screen-box in the line of its longitudinal center is supported a pipe 15, having a suitable connection, such as 16, with a source of water-supply 17. The pipe 15 is closed at its extremity by a cap 18. On its under side it is provided with spraying-apertures 19 of any suitable character—such, for example, as the cross-slits. (Shown best in Fig. 3.) These spray-slits are arranged at suitable intervals, care being taken to arrange certain ones, such as those marked 19', in such a position that they will direct the jets upon the peach just when it is ready to drop upon the succeeding screen, so that the water will turn the peach over every time it drops, and consequently cause it to present alternately its cup and its back to the spray or jets.

23 is the feed-spout.

24 represents water-jet nozzles connected by a pipe 25 with the water system and adapted to throw water-jets upon the fruit as it falls into the screen-box from the spout 23.

27 is a discharge-hopper the walls of which converge to a discharge-aperture 28, opening into a discharge-trough 29. From the sides of the box converge roof or cover pieces 30 to prevent splashing.

The operation of the apparatus is as follows: The fruit having by previous processes had its skin disintegrated and rendered soft is fed from spout 23 upon the highest screen-section 7 of the box 4. The water-jets from nozzles 24 serve to preliminarily cool and wash the fruit. In the shaking-box 4 the fruit is agitated and shaken first upon the highest screen-section 7 and as it advances thereon is subjected to the peeling action of the water-jets from apertures 19. When it is about to fall from section 7 to 7', the jet from aperture 19' catches it and turns it over in falling—say cup side up, meaning thereby the side presenting the concavity or depression of the fruit. In substantially this position it advances over section 7', being subjected to the action of the peeling-jets until it is about to drop to section 7², when the jet from an aperture 19' catching it turns it with its back up, and thus it advances along section 7², and so on to the end, alternately reversing or turning over as it drops from section to section. Thus with only the upper jets all parts of the peach are reached, and the surface of the screen-sections may be made as smooth as desired, thereby avoiding any injury to the fruit.

Having thus described my invention, what I claim as new, and desire to secure by Letters Patent, is—

1. In an apparatus for removing the previously-disintegrated skin from fruit, the combination of a screen-support for the fruit, composed of a plurality of sections in successively lower planes, means for advancing the fruit over said sections from higher to lower successively, and means for directing water-jets from above upon said fruit as it advances over the screen-sections.

2. In an apparatus for removing the previously-disintegrated skin from fruit, the combination of a screen-support for the fruit, composed of a plurality of sections in successively lower planes, means for advancing the fruit over said sections from higher to lower successively, and means for directing water-jets from above upon said fruit as it advances over the screen-sections, certain of said jets being disposed for delivery upon the fruit as it is about to drop from one screen-section to another.

3. In an apparatus for removing the previously-disintegrated skin from fruit, the combination of a shaking-box adapted to receive, agitate, and advance the fruit, said box having a screen-bottom for supporting the fruit, composed of a plurality of sections in successively lower planes, means for shaking the box, means for supplying the fruit to the highest of said screen-sections, thereby providing for its advancement over said sections from higher to lower successively, and means for directing water-jets from above upon said fruit as it advances over the screen-sections.

4. In an apparatus for removing the previously-disintegrated skin from fruit, the combination of a shaking-box adapted to receive, agitate and advance the fruit, said box having a screen-bottom for supporting the fruit, composed of a plurality of sections in successively lower planes, means for shaking the box, means for supplying the fruit to the highest of said screen-sections, thereby providing for its advancement over said sections from higher to lower successively, and means for directing water-jets from above upon said fruit as it advances over the screen-sections, certain of said jets being disposed for delivery upon the fruit as it is about to drop from one screen-section to another.

In witness whereof I have hereunto set my hand.

HERMANUS ALBERT BEEKHUIS.

Witnesses:
 ED HOLT,
 A. F. FLORY.